United States Patent
Wong

(10) Patent No.: US 6,465,760 B1
(45) Date of Patent: Oct. 15, 2002

(54) ROTISSERIE GRILL

(75) Inventor: Ying Man John Wong, Shatin (HK)

(73) Assignee: Raymond Electric (China) Ltd., Shatin (HK)

(*) Notice: Subject to any disclaimer, the term of this patent is extended or adjusted under 35 U.S.C. 154(b) by 0 days.

(21) Appl. No.: 10/012,932

(22) Filed: Dec. 10, 2001

(51) Int. Cl.$^7$ ................................................ A47J 37/04
(52) U.S. Cl. ........................ 219/398; 219/414; 219/492; 99/332
(58) Field of Search ................................ 219/398, 411, 219/414, 492; 99/332, 421 V

(56) References Cited

U.S. PATENT DOCUMENTS 2,663,786 A * 12/1953 Illian et al. .................. 219/398
4,238,669 A * 12/1980 Huntley ....................... 219/398
6,054,681 A *  4/2000 Siu ............................ 219/398

FOREIGN PATENT DOCUMENTS

JP          7-213436     *  8/1995

* cited by examiner

Primary Examiner—Joseph Pelham
(74) Attorney, Agent, or Firm—Alix, Yale & Ristas, LLP

(57) ABSTRACT

A rotisserie grill includes a control device that alternates heat generation by a plurality of heating elements disposed at the periphery of a cooking chamber. The alternating heat evenly cooks food in a manner similar to a traditional rotisserie, while eliminating the need for food-rotating apparatus. The control device is a timer, which rotates a cam having a profile that actuates a switch. Heating elements are connected to the switch such that when one is energized, the other is not energized. The on/off cycle produced by the rotating cam repeats every 1 to 2 minutes. The rotisserie grill may be provided with multiple heating elements controlled by multiple switches. More than one cam may be employed to actuate the multiple switches in a complex pattern to simulate relative movement between the heating elements and the food.

11 Claims, 8 Drawing Sheets

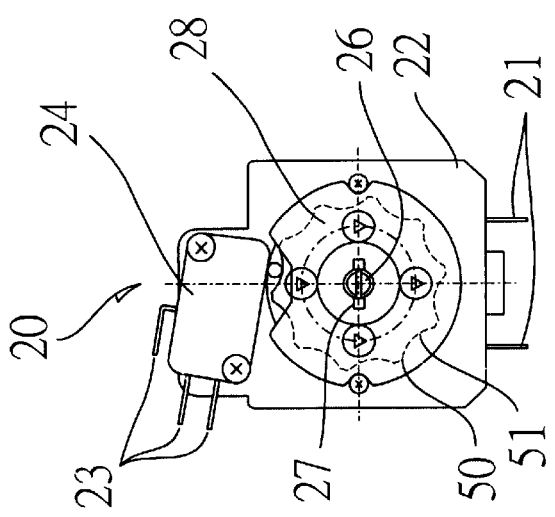
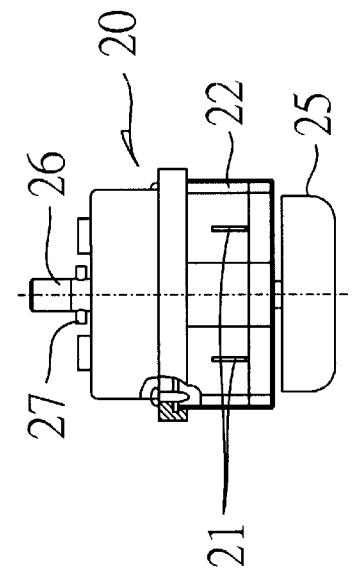
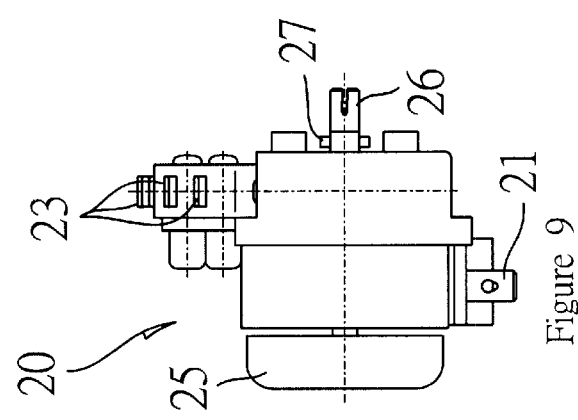
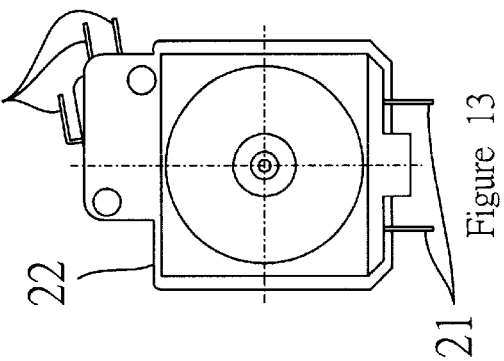
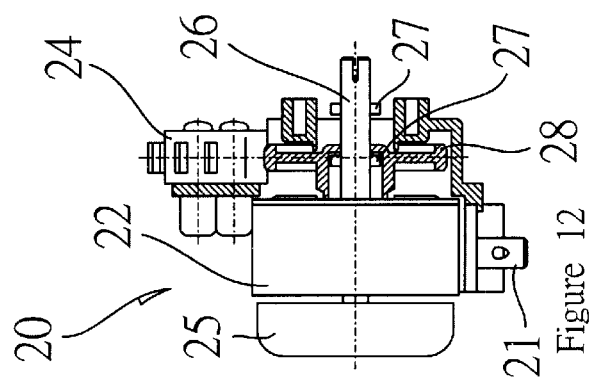

| HEATER ITEM | CONTROL FUNCTION | | | | | |
|---|---|---|---|---|---|---|
| 43a | ● | ○ | ● | ○ | ● | ○ |
| 45b | ● | ○ | ○ | ● | ○ | ● |
| 43b | ○ | ● | ● | ○ | ○ | ● |
| 45a | ○ | ● | ○ | ● | ● | ○ |
"●" HEATER ON , "○" HEATER OFF
Figure 18
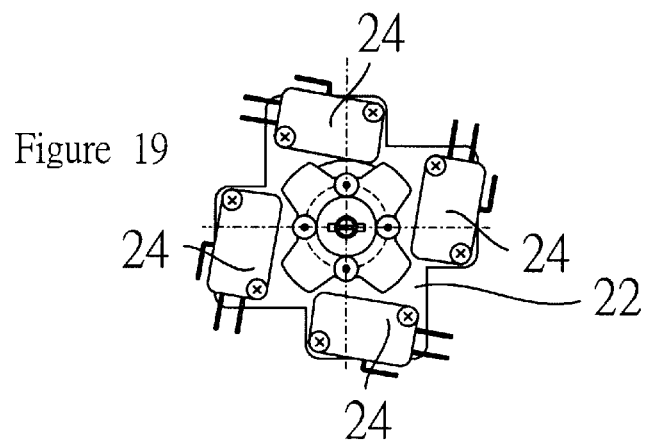
Figure 19
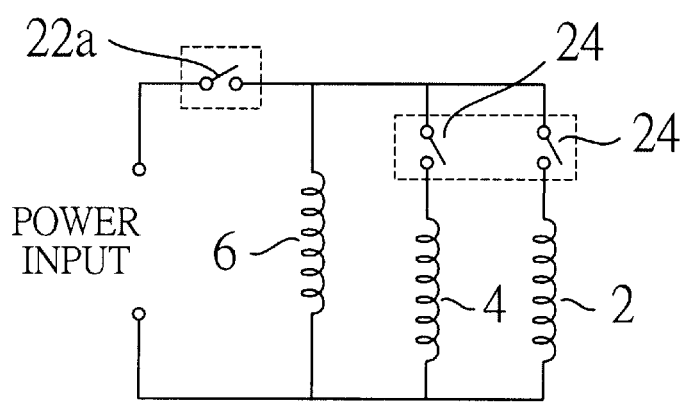
Figure 20

ROTISSERIE GRILL

BACKGROUND OF THE INVENTION

1. Field of the Invention

The present invention relates to the field of rotisseries for roasting food. More particularly, the present invention relates to a simplified electric rotisserie for roasting food.

2. Description of the Related Art

Electric rotisseries for roasting food are well known in the art. Rotisseries constructed for use in the food service industries typically rotate the cooking food adjacent heat sources which can be electric heating elements, burning wood or charcoal or gas flame. Food service rotisseries are characterized by large size, high cost and mechanical complexity. The apparatus for rotating the meat typically involves an electric motor and some form of mechanical transmission. Rotating the food is considered the key to uniform cooking.

Rotisseries for use in the home are also available. Home rotisseries are characterized by reduced size and lower cost. However, the home rotisserie typically retains mechanical apparatus for rotating the roasting food. Some home rotisseries rotate on a vertical axis while others rotate on a horizontal axis. Inclusion of mechanical rotating apparatus in the rotisserie increases the cost and complexity of the home rotisserie. In the harsh environment of a rotisserie oven, the mechanical rotating apparatus wears quickly, resulting in failure of the appliance or necessitating costly maintenance of the rotating apparatus.

There is a need in the art for a compact, inexpensive and uncomplicated appliance for the homeowner which produces evenly roasted food.

SUMMARY OF THE INVENTION

An object of the present invention is to provide a new and improved rotisserie grill of simplified and efficient construction.

Another object of the present invention is to provide a new and improved rotisserie grill with a minimum number of moving parts.

A further object of the present invention is to provide a new and improved rotisserie grill that quickly and evenly roasts food placed therein.

These and other objects of the present invention are achieved in a rotisserie grill where the food remains stationary relative to the heating elements while an electromechanical control device switches electric power alternately among several heating elements surrounding the food. Alternating delivery of electric power to heating elements surrounding the food provides even cooking of the food while eliminating the requirement for relative movement between the food and the heating elements.

In one embodiment of the rotisserie grill the food is secured to an upright rack which is disposed in the middle of a vertical-cooking chamber. The rack surrounds a central heating element while at least two side heating elements are arranged to substantially surround the centrally located food/rack. A control timer permits the user to select an overall cooking duration. During the cooking time selected, power is continuously applied to the central heating element while the control timer alternately delivers power to the side elements. Alternate application of power to the side heating elements simulates relative movement between the food and the heaters and produces an evenly cooked, rotisserie-like result. An alternative embodiment includes four side heaters.

An alternative configuration of the rotisserie grill utilizes a horizontal food rack for supporting food between at least two upper and two lower heating elements. In this embodiment, the control timer alternately applies electric power to each of the upper and lower heating elements, again simulating relative movement between the food on the rack and the heating elements to produce a rotisserie-like result.

Either embodiment of the rotisserie grill eliminates the need for bulky, expensive and maintenance intensive mechanisms for rotating the food relative to the heat sources. Instead, a compact control timer utilizes a spring-driven rotating cam and switch arrangement to apply electric power to selected heating elements disposed adjacent to the food. The resulting rotisserie grill is of simplified construction, compact size and increased reliability.

BRIEF DESCRIPTION OF THE DRAWINGS

These and other objects, features, and advantages of the invention will become readily apparent to those skilled in the art upon reading the description of the preferred embodiments, in conjunction with the accompanying drawings in which:

FIG. 9 is a side exterior view of a control timer suitable for use in conjunction with a rotisserie grill in accordance with the present invention;

FIG. 10 is a right end view of the control timer shown in FIG. 9;

FIG. 11 is a bottom side view, partly cut away and partly in section, of the control timer shown in FIG. 9;

FIG. 12 is the side view of FIG. 9 partly in section;

FIG. 13 is a left end exterior view of the control timer shown in FIG. 9;

FIG. 18 is a table illustrating a representative pattern of "on" and "off" cycles for the heaters of the rotisserie grill illustrated in FIGS. 6–8;

FIG. 19 is a bottom view of a control timer with four micro switches attached thereto; and FIG. 20 is an electrical schematic diagram of power delivery to the heaters of the rotisserie grill shown in FIGS. 1–5.

DETAILED DESCRIPTION OF THE PREFERRED EMBODIMENT

Figure 2:
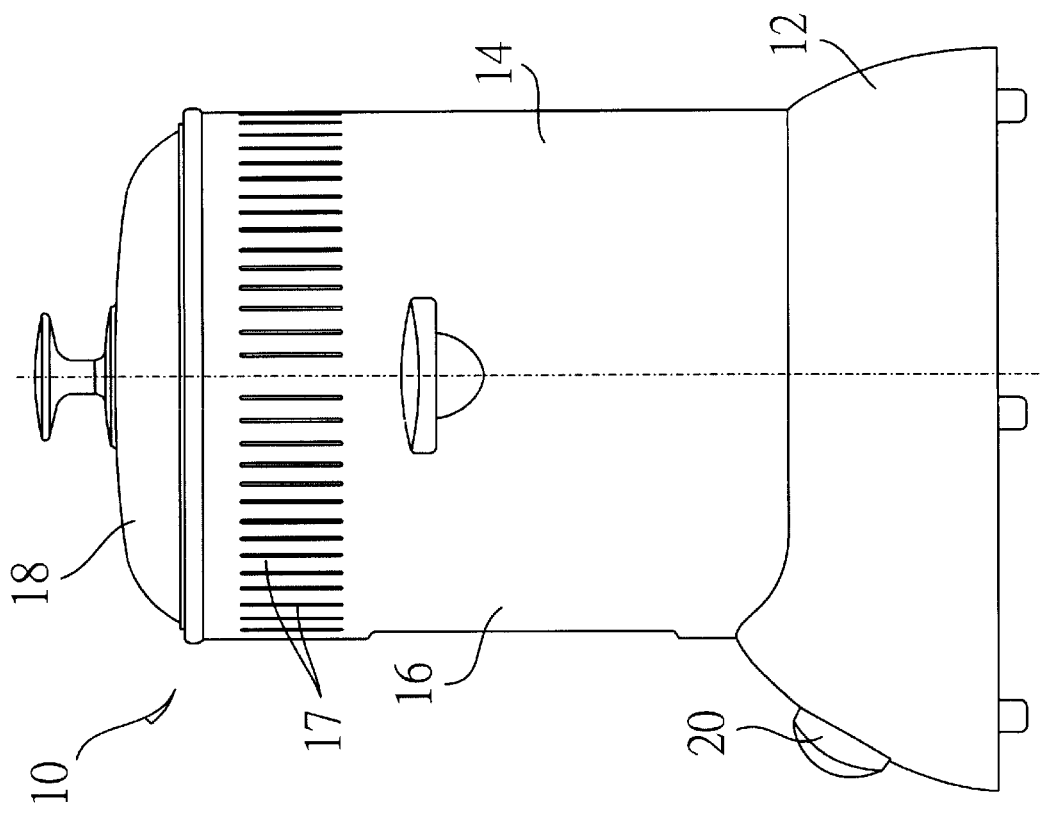
FIG. 2 is a side exterior view of the rotisserie grill shown in FIG. 1.
Figure 1:
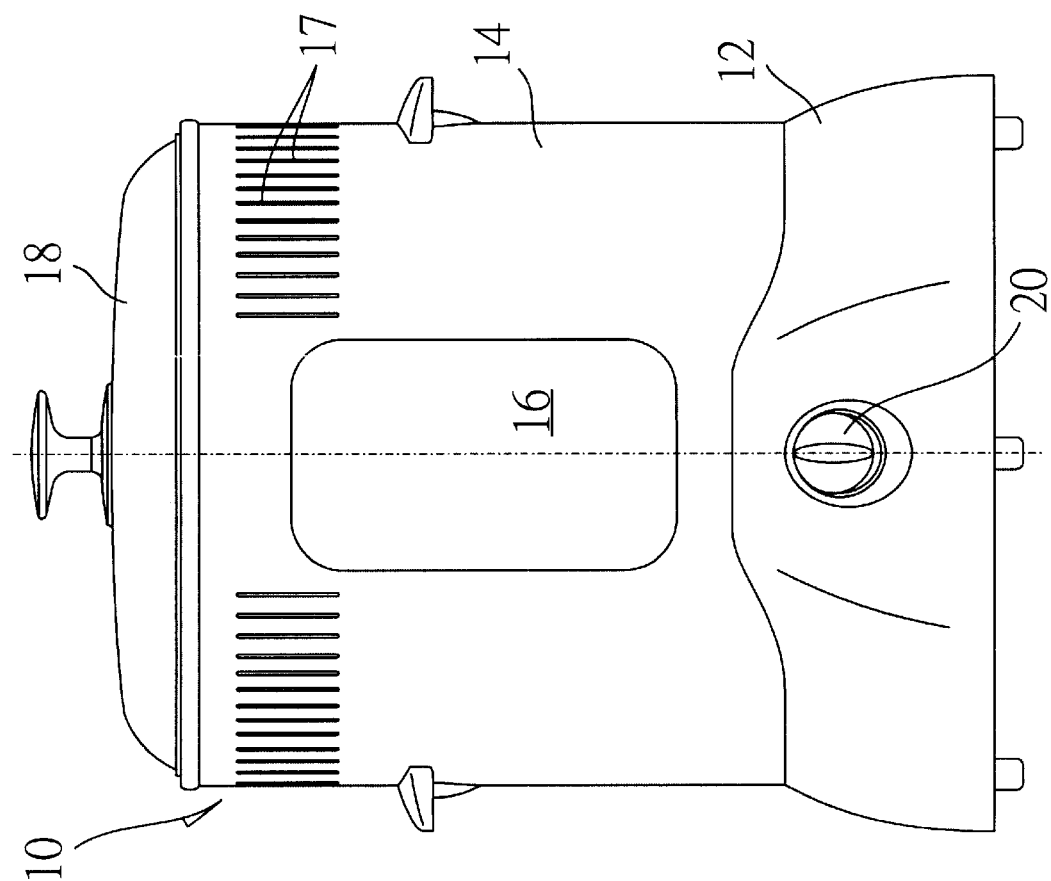
FIG. 1 is a front exterior view of a preferred embodiment of a rotisserie grill in accordance with the present invention.

FIGS. 1–5 illustrate the overall configuration of a first preferred embodiment of a rotisserie grill 10 in accordance with the present invention. The rotisserie grill 10 defines a vertical cooking chamber 9 having a greater width (measured left to right of FIGS. 1, 4 and 5) than depth (measured left to right in FIGS. 2 and 3).

The front of the rotisserie grill (best seen in FIG. 1) includes a window 16 through which the food in the cooking chamber may be observed. A knob 25 for a control timer 20 is also arranged on the front of the rotisserie grill 10. The cooking chamber 9 is defined by a double wall 14 mounted to a base 12. The upper portion of the double wall includes slit vents 17. A baffle 15 is arranged within the double wall 14 so that the vents 17 do not open directly into the cooking chamber 9.

Figure 4:
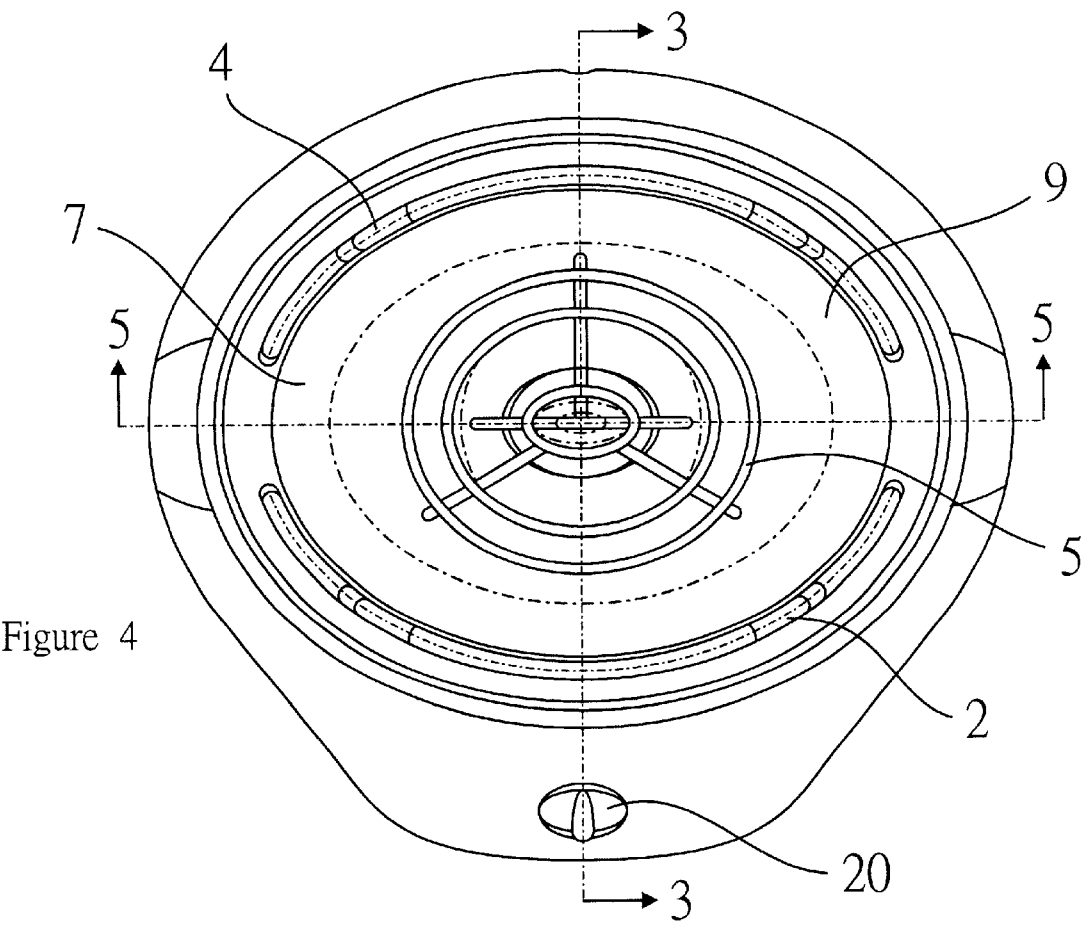
FIG. 4 is a top view of the rotisserie grill shown in FIG. 1 (lid removed for clarity)

The oval shape of the cooking chamber 9 is clearly illustrated in FIG. 4. A rack 5 is arranged in the center of the cooking chamber 9. The rack comprises a tubular centerpiece 8, around which are secured an arrangement of metal bars for supporting food (not illustrated). The hollow centerpiece 8 of the rack 5 surrounds and substantially encloses the center-heating element 6. The illustrated preferred embodiment 10 includes two side heating elements 2, 4 arranged adjacent the front and rear walls of the cooking chamber 9. The side heating elements 2, 4 are curved to the shape of the wall 14 of the cooking chamber 9 as best seen in FIG. 4.

Figure 5:
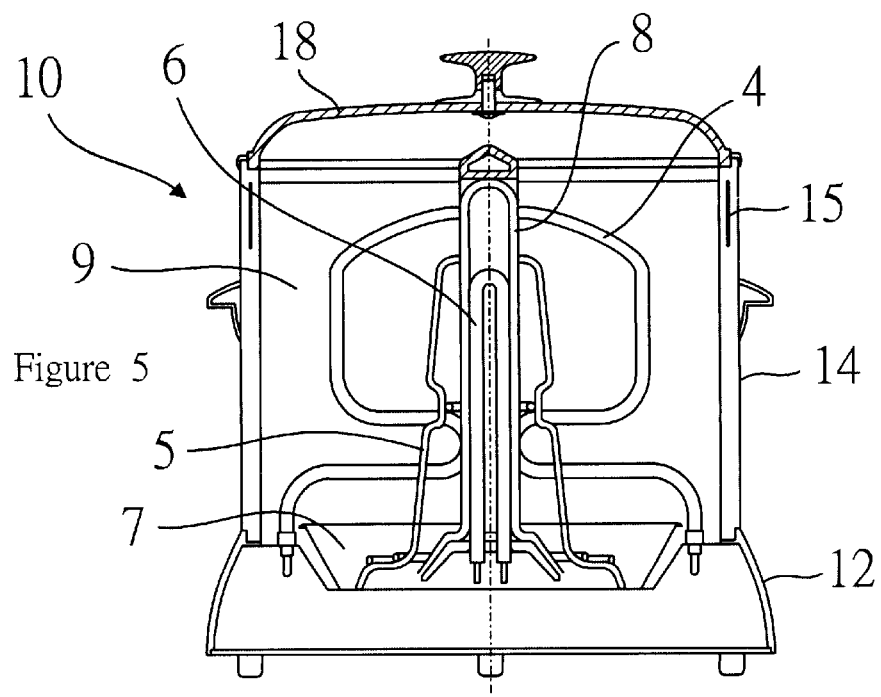
FIG. 5 is a side sectional view through the rotisserie grill shown in FIG. 1 taken along line 5—5 of FIG. 4.
Figure 16:
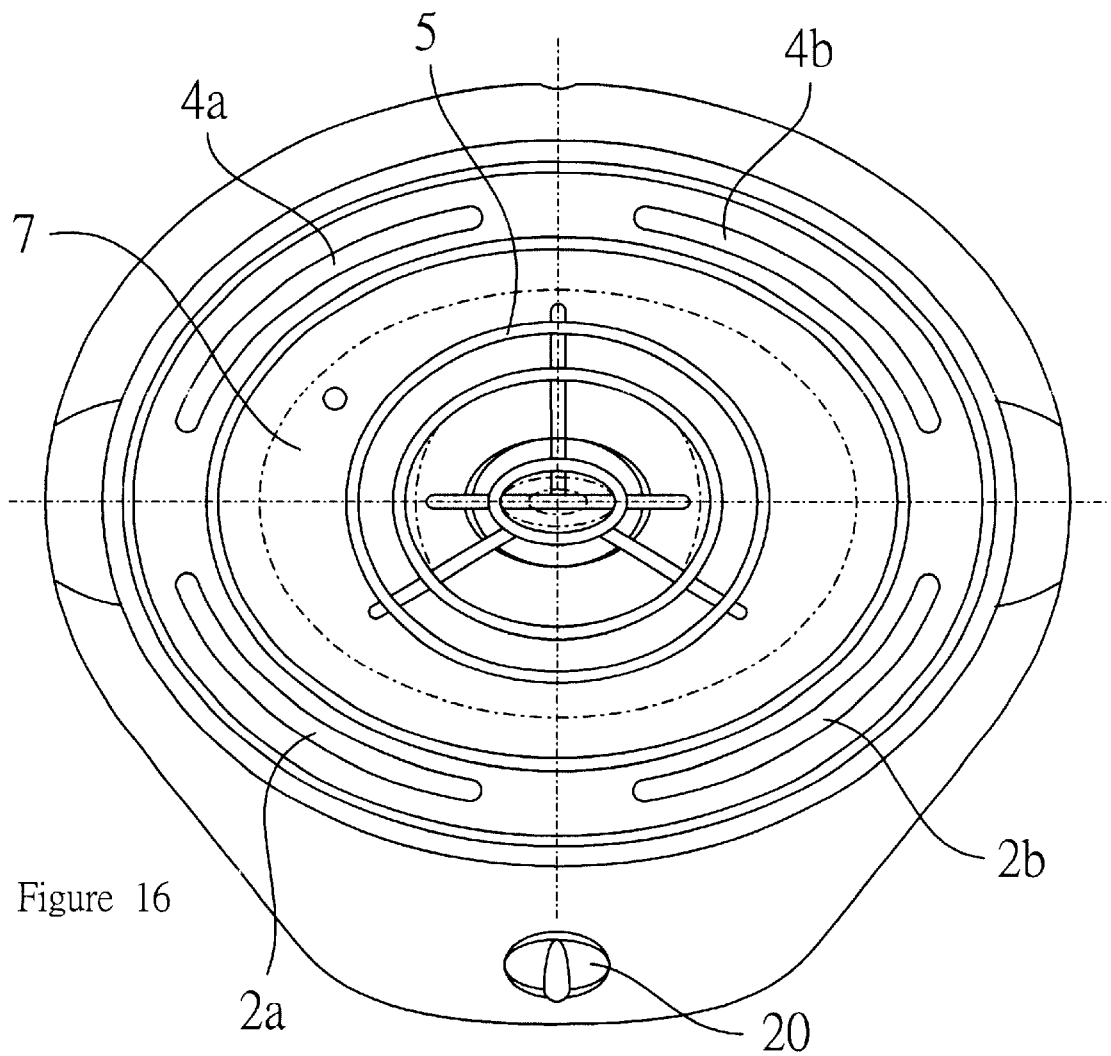
FIG. 16 is a top view of an alternative embodiment of the rotisserie grill of FIG. 1 (lid removed for clarity)

FIG. 5 illustrates the rear side heating element 4 and center element 6 relative to the other components of the rotisserie grill 10. Each side heating element 2, 4 has an arcuate serpentine configuration best seen in FIGS. 3 and 5. This arcuate serpentine configuration provides an extended heat radiating surface for each side heater element 2, 4. The serpentine configuration of the side heater elements 2, 4 also aids in evenly distributing heat generated thereby over the surface of the food fixed to the rack 5. FIG. 16 illustrates an alternative side heater arrangement in which four side heaters 2a, 2b, 4a and 4b are arranged around the periphery of the cooking chamber 9.

Figure 3:
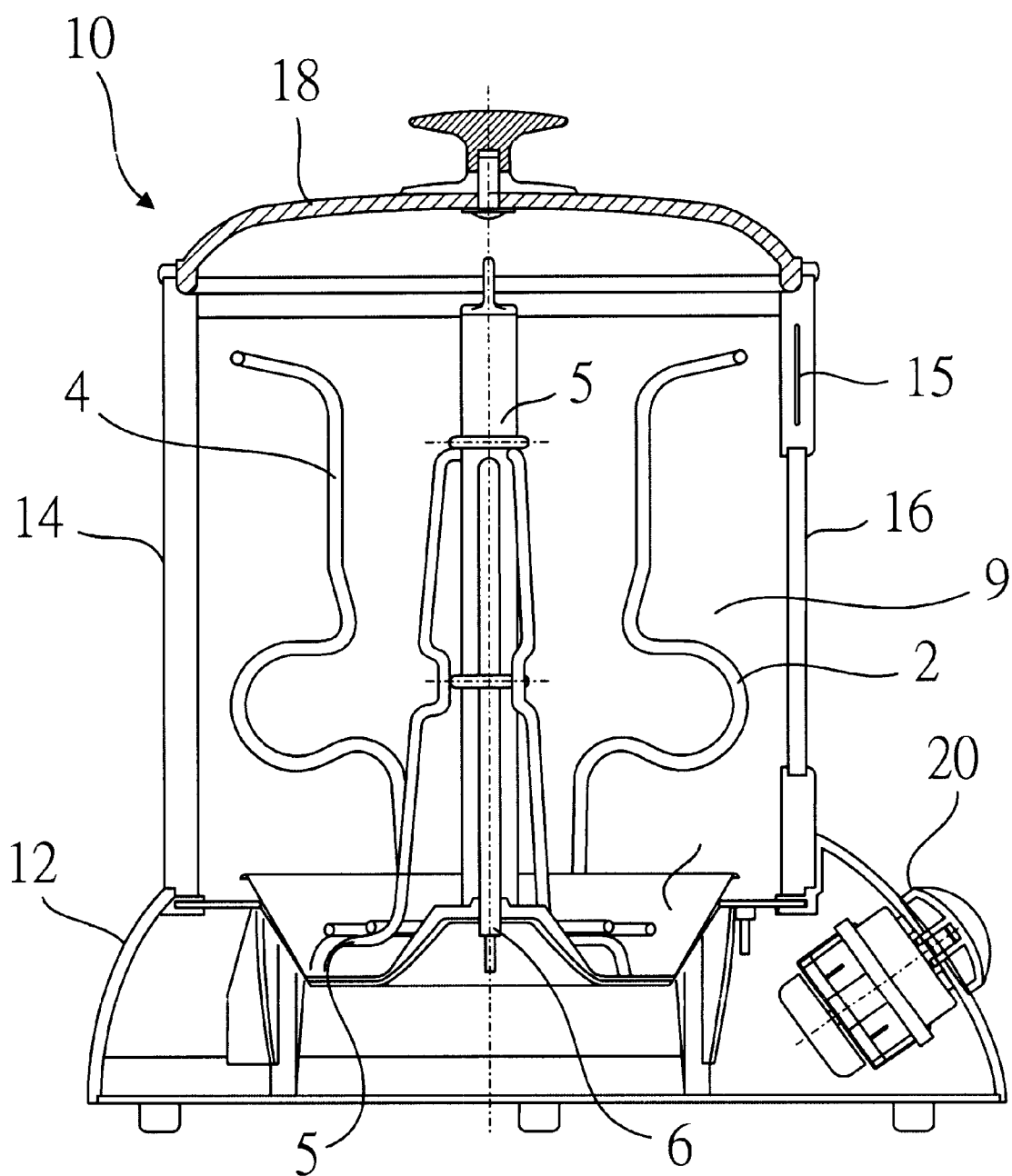
FIG. 3 is a side sectional view through the rotisserie grill shown in FIG. 1 taken along line 3—3 of FIG. 4.

FIG. 5 also illustrates a drip pan 7 arranged beneath the centrally located rack 5 to catch juices and/or fat from the cooking food. A close-fitting lid 18 to retain heat and moisture during cooking closes off the cooking chamber 9 from above. The side sectional view of FIG. 3 shows that the side heating elements 2, 4 do not completely surround the cooking chamber 9. However, the oval configuration of the cooking chamber 9 makes this unnecessary by permitting the laterally extended side-heating elements 2, 4 to effectively surround food secured to the centrally located rack 5. The four side heaters 2a, 2b, 4a, 4b of FIG. 16 more evenly surround the food.

The heaters used in accordance with the present invention are of the tubular type, having a metallic outer tube that surrounds a resistive heating element encased in heat resistant insulation. The power requirements of such heating elements vary with the gage of the resistive heating element as well as the overall length of the heater. In the illustrated preferred embodiment of FIGS. 1–5, the center heater 6 consumes in the range of 160–200 watts of electrical power. Each side heater 2, 4 consumes in the range of 800–1000 watts of electrical power. The maximum temperature at the outer tube of this type of heater is approximately 760° C. The four side heaters 2a, 2b, 4a, 4b of FIG. 16 consume between 300 and 500 watts each.

A control timer 20 permits the user to select the duration of cooking. For the duration of cooking selected by the user, the control timer 20 alternately applies electrical current to the side heaters 2, 4. Thus, the side heaters 2, 4 alternately apply cooking heat to food arranged on the rack 5. This intermittent application of heat simulates relative movement between the food and the heat sources produced in the typical rotating rotisserie. In accordance with a significant aspect of the present invention, the control timer 20 applies electrical power to the central heater for the selected duration of cooking. Heat generated by the center heater 6 is taken up by the metallic rack 5 and transmitted to the food. Heat generated by the side heaters 2, 4 is radiated directly onto the food and also reflected onto the food by the adjacent wall 14 surrounding the cooking chamber 9. Heat generated by the various heaters is trapped within the cooking chamber by the lid 18.

In accordance with a particular aspect of the invention, a control timer 20 such as that illustrated in FIGS. 9–15 controls the flow of electric current to the center and side heaters. A control timer body 22 includes an electric timer responsive to the position of a control knob 25. Rotation of the control knob 25 approximately 270° sets the maximum cooking duration of 60 minutes. Of course, the user may select any cooking duration up to the maximum by rotation of the control knob 25 some smaller amount.

A control shaft 26 projects from the control timer body 22 opposite the control knob 25. The shaft 26 is rotated by the control timer for the duration of a timed event, e.g. the selected duration of cooking. The shaft 26 includes two sets of projections 27, one of which, in the disclosed embodiment, engage a cam wheel 28 for rotation with the shaft 26. The cam wheel 28 illustrated in FIG. 10 comprises a series of peaks 50 separated by concave arcs defining troughs 51. A micro switch 24 is arranged adjacent the cam wheel 28 for actuation by the peaks 50 of the cam wheel. The micro switch 24 is provided with normally open and normally closed contacts connected to terminals 23. In accordance with the present invention, one side heater is connected to the normally open contacts of the micro switch 24 while the other side heater is connected to the normally closed contacts. In this manner, the side heaters 2, 4 are alternatively provided with power as the control timer shaft 26 rotates. In accordance with the present invention, this on-off sequence repeats every one to two minutes. The center heater 6 is connected directly to the control timer 20 such that the center heater 6 is provided with electrical power for the duration of the cooking cycle. When the selected cooking duration has elapsed, the control timer 20 removes electrical power from all the heating elements 2, 4, 6.

FIG. 20 illustrates an alternative electrical schematic for the rotisserie grill embodiment of FIGS. 1–5. Instead of routing power to both side heaters through one micro switch, power is delivered to the side heaters 2, 4 through micro switches 24 actuated by the control timer 20. It should be noted that power is delivered to center heater 6 continuously, while side heaters 2, 4 receive power intermittently through switches 24 actuated by a cam wheel driven by the control timer as will be explained below.

Figure 17:
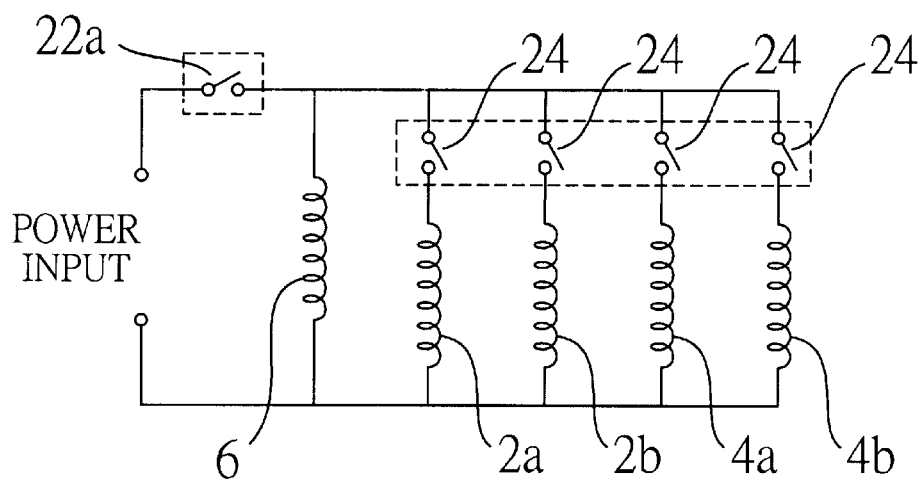
FIG. 17 is an electrical schematic diagram of power delivery to the heaters of the rotisserie grill shown in FIG. 16.

FIG. 17 illustrates one possible electrical schematic for the rotisserie grill of FIG. 16. Power to each of the four side heaters 2a, 2b, 4a, 4b is delivered through a micro switch actuated by a cam wheel driven by the control timer 20. Power is delivered to the side heaters in an alternating pattern to simulate relative movement between the heat source and the food on the stationary rack 5.

The only moving parts in the inventive rotisserie grill are those of the control timer 20. The control timer 20 is of the type driven by a coiled spring (not illustrated). Turning the control knob 25 in a clockwise direction tensions the spring, which unwinds in a controlled manner to turn the control timer shaft 26 at a substantially constant speed. The control timer body 22 contains the tension and controlled release mechanisms as well as a first set of electrical contacts 22a responsive to the timer. Connectors 21 are electrically connected to the internal contacts 22a of the control timer 20. In the embodiments of FIGS. 1–5 and 16, power is provided to the center heater 6 by these internal electrical contacts 22a and are electrically connected for the duration of a selected cooking cycle. FIGS. 17 and 20 illustrate how power to all the heating elements is controlled by internal electrical contacts 22a. FIGS. 17 and 20 also illustrate that each side heating element may be provided with its own micro switch 24 for control of electrical energy delivered thereto.

Figure 15:
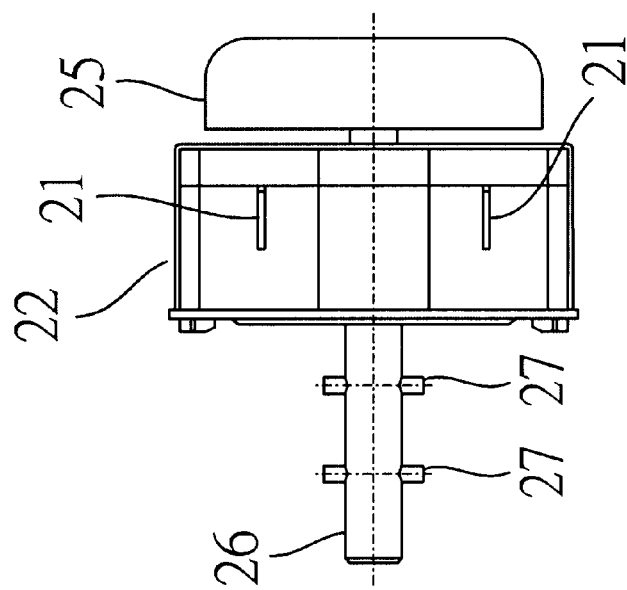
FIG. 15 is an exterior side view of the timer body shown in FIG. 14 rotated 90 to the left.
Figure 14:
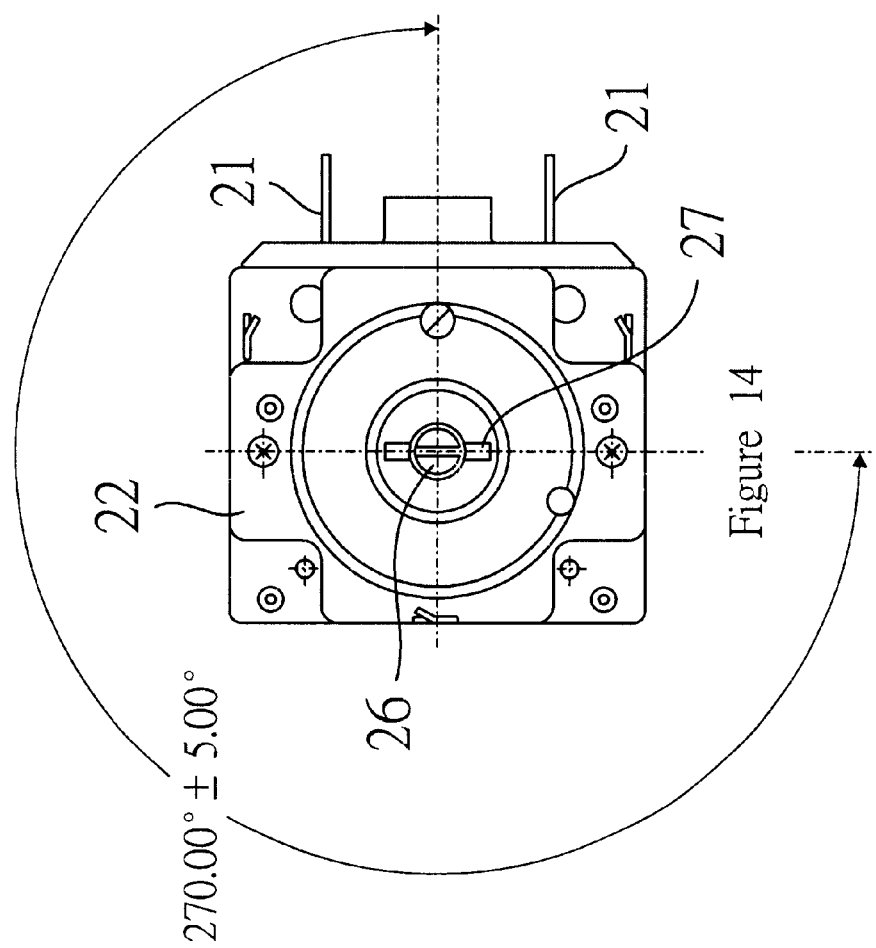
FIG. 14 is a bottom view of a timer body suitable for use in the control timer shown in FIG. 9.

It can be seen from FIGS. 12 and 15 that the control timer shaft 26 includes two pairs of projections 27. One pair of projections 27 is used to rotate the cam wheel 28. The second set of projections may be fitted with a similar cam/micro switch arrangement for control of further heating elements. In addition, alternative cam profiles and switch arrangements are possible. Each micro switch 24 is a single pole, single throw switch capable of transmitting the high current required by the side heaters, 2, 4 without resort to a relay circuit. FIG. 19 illustrates how four micro switches can be arranged around the base 22 of a control timer 20 for actuation by a single cam wheel.

Figure 6:
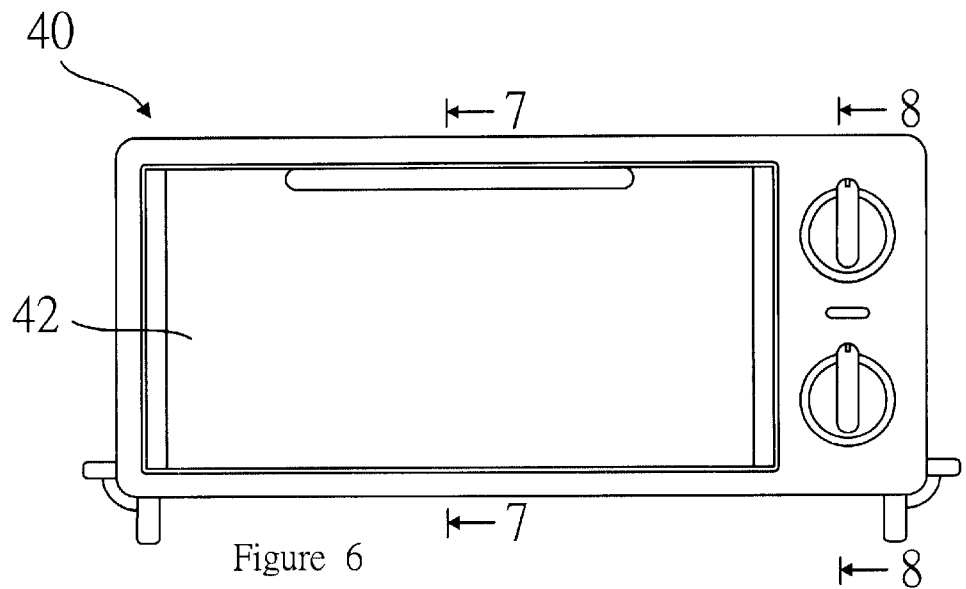
FIG. 6 is a front exterior view of an alternative embodiment of a rotisserie grill in accordance with the present invention.
Figure 7:
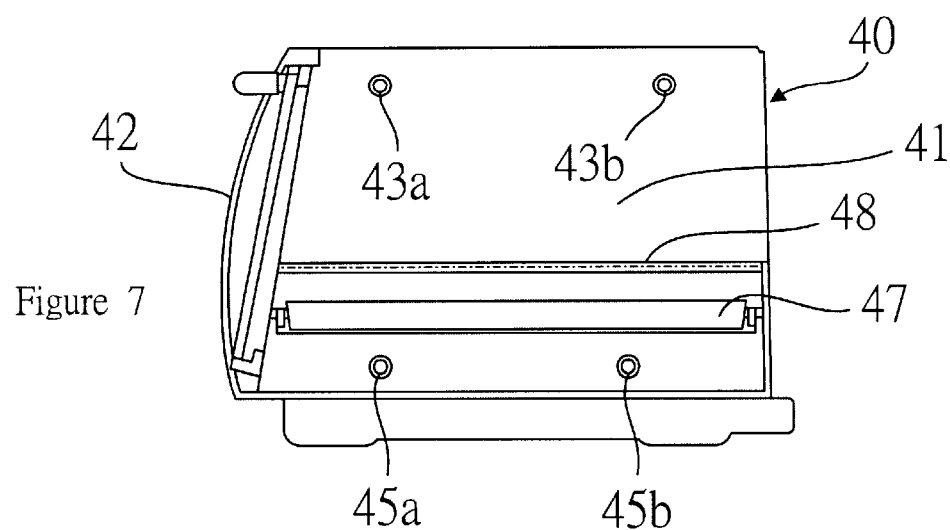
FIG. 7 is a side sectional view through the rotisserie grill shown in FIG. 6 taken along line 7—7 thereof.
Figure 8:
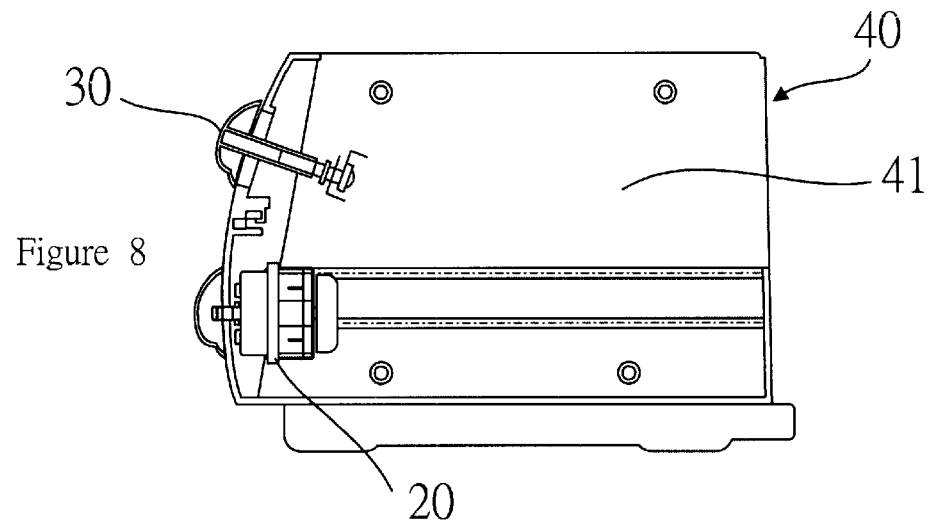
FIG. 8 is a side sectional view through the rotisserie grill shown in FIG. 6 taken along line 8—8 thereof.

FIGS. 6–8 illustrate an alternative embodiment of rotisserie grill 40 in accordance with the present invention. The alternative rotisserie grill 40 defines a horizontal-cooking chamber 41 in which straight heating elements 43a, 43b, 45a, 45b are arranged across the top and bottom of the cooking chamber 41. A door 42 closes off the front of the cooking chamber 41. In the illustrated embodiment 40, two heating elements 43a, 43b are arranged above and two heating elements 45a, 45b are arranged below a horizontal cooking rack 48. A tray 47 is disposed below the cooking rack 48 to catch drippings. A control timer 20 alternately applies power to the heating elements 43a, 43b, 45a, 45b. The heating elements are alternately provided with electrical power to simulate relative movement between the food and the heat sources. FIG. 18 illustrates one possible pattern of energy delivery to the four heaters 43a, 43b, 45a, 45b. A second control knob 30 is provided on the face of the rotisserie grill for the purpose of overall temperature control as is known in the art.

While preferred embodiments of the foregoing invention have been set forth for purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. A rotisserie grill comprising:
   at least one wall defining a cooking chamber;
   a plurality of heating elements disposed within said cooking chamber;
   a removable rack positionable in said cooking chamber for support of food to be cooked therein; and
   a control timer which controls the generation of heat by said plurality of heating elements, said heat generated over a pre-selected cooking duration;
   wherein said control timer causes heat to be generated alternately by at least two of said heating elements for said pre-selected cooking duration.

2. The rotisserie grill of claim 1, wherein said control timer comprises:
   a control shaft that rotates at a substantially constant rate for said cooking duration;
   at least one cam fixed relative to said shaft for rotation therewith, said at least one cam defining an outer cam profile including peaks and troughs; and
   at least one switch arranged to be actuated by the peaks and troughs of said cam profile,
   wherein said heating elements are provided with electrical power by said control timer and said at least two heating elements are connected to said switch such that said peaks cause electrical power to be delivered to one and said troughs cause electrical power to be delivered to the other of said at least two heater elements.

3. The rotisserie grill of claim 1, further comprising at least one center heating element located in the center of said cooking chamber.

4. The rotisserie grill of claim 3, wherein said at least one center heating element is provided with electrical power continuously by said control timer for the cooking duration.

5. The rotisserie grill of claim 3, wherein said cooking chamber is generally vertical and said removable rack substantially surrounds said at least one center heating element.

6. The rotisserie grill of claim 1, wherein said at least one wall defines a generally vertical oval-shaped cooking chamber with at least one center heating element positioned vertically in the center of said cooking chamber and said at least two heating elements are positioned at the periphery of said cooking chamber radially spaced from said at least one center heating element.

7. A rotisserie grill comprising:
   at least one wall defining a cooking chamber;
   at least one center heating element and a plurality of side heating elements disposed within said cooking chamber;
   a removable rack positionable in said cooking chamber for support of food to be cooked therein; and
   a control timer which controls the generation of heat by said at least one center heating element and said plurality of side heating elements, said heat generated for a pre-selected cooking duration;
   wherein said control timer causes heat to be generated alternately by at least two of said heating elements for said preselected cooking duration.

8. The rotisserie grill of claim 7, wherein said control timer comprises:
   a control shaft that rotates at a substantially constant rate for said cooking duration;
   at least one cam fixed relative to said shaft for rotation therewith, said at least one cam defining an outer cam profile including peaks and troughs; and
   at least one switch arranged to be actuated by the peaks and troughs of said cam profile,
   wherein said heating elements are provided with electrical power by said control timer and said plurality of side heater elements comprise two side heating elements connected to said switch such that said peaks cause electrical power to be delivered to one and said troughs cause electrical power to be delivered to the other of said two side heater elements.

9. The rotisserie grill of claim 7, wherein said control timer comprises:

a control shaft that rotates at a substantially constant rate for said cooking duration;

at least one cam fixed relative to said shaft for rotation therewith, said at least one cam defining an outer cam profile including peaks and troughs; and a plurality of switches arranged to be actuated by the peaks and troughs of said cam profile, each of said plurality of switches electrically connected to deliver electrical power to one of said plurality of side heating elements, wherein electrical power is routed through a set of contacts internal to said control timer and said plurality of switches are arranged such that said outer cam profile actuates said plurality of switches to deliver electrical power to said plurality of side heating elements in a pre-selected pattern.

10. A rotisserie grill comprising:

a wall defining a cooking chamber;

a plurality of heating elements disposed within said cooking chamber;

a spring driven control timer comprising:

a control knob rotatable to select a cooking duration;

a timer shaft which rotates at a substantially fixed rate in response to actuation of said control timer by rotation of said control knob;

at least one cam fixed relative to said timer shaft for rotation therewith, said at least one cam defining a cam profile;

at least one set of electrical contacts internal to the control timer; and at least one switch arranged to be actuated by said cam profile, wherein electrical power is delivered to said at least one switch by said at least one set of electrical contacts, said timer shaft rotates said at least one cam for said selected cooking duration and said at least one switch is actuated by said cam profile to deliver power to said plurality of heating elements in a pre-selected pattern.

11. The rotisserie grill of claim 10, wherein said plurality of heating elements comprises a center heating element and a plurality of side heating elements and power is delivered to said center heating element for the selected duration of cooking while power is delivered to said plurality of side heating elements through said at least one switch.

* * * * *